C. A. HAISLEY.
HOG OILER.
APPLICATION FILED FEB. 15, 1921.

1,390,611.

Patented Sept. 13, 1921.
2 SHEETS—SHEET 1.

WITNESS:
Leo S. Hillman.

Inventor:
Charles A. Haisley;
By Robert W. Candle
Attorney.

C. A. HAISLEY.
HOG OILER.
APPLICATION FILED FEB. 15, 1921.

1,390,611.

Patented Sept. 13, 1921.
2 SHEETS—SHEET 2.

Inventor:
Charles A. Haisley;

By
Robert A. Taudle,
Attorney.

WITNESS:
Leo S. Hillman.

UNITED STATES PATENT OFFICE.

CHARLES A. HAISLEY, OF RICHMOND, INDIANA.

HOG-OILER.

1,390,611.   Specification of Letters Patent.   Patented Sept. 13, 1921.

Application filed February 15, 1921. Serial No. 445,170.

*To all whom it may concern:*

Be it known that I, CHARLES A. HAISLEY, a citizen of the United States, residing near the city of Richmond, in the county of Wayne, State of Indiana, have invented a new and useful Construction for Hog-Oilers, of which the following is a full, clear, and comprehensive specification and exposition, the same being such as will enable others to make and use the same with exactitude.

It is well known among farmers that stock, and especially hogs become infected with skin diseases, and with lice, fleas, and other insects which are all detrimental to the animals. It has also been demonstrated that oil, when properly applied to the animal, is one of the best detergents that can be used for cleansing the animal's skin and for exterminating the insects. Therefore the main object of this invention is to provide a device for applying oil to the animals in the proper manner, the same being adapted to be operated by the animal itself, whereby the operation of the device will be practically automatic, as no manual labor will be required except to keep the reservoir supplied with oil.

Broadly speaking, my invention contemplates a hog oiler which will be strong and durable in construction, simple in character, easily operated and controlled, automatic in operation, and which can be manufactured and sold at a comparatively low price.

Various other minor objects and particular advantages of my invention will be made apparent in the course of the following description, and that which is new will be correlated in the appended claims.

Figure 1:
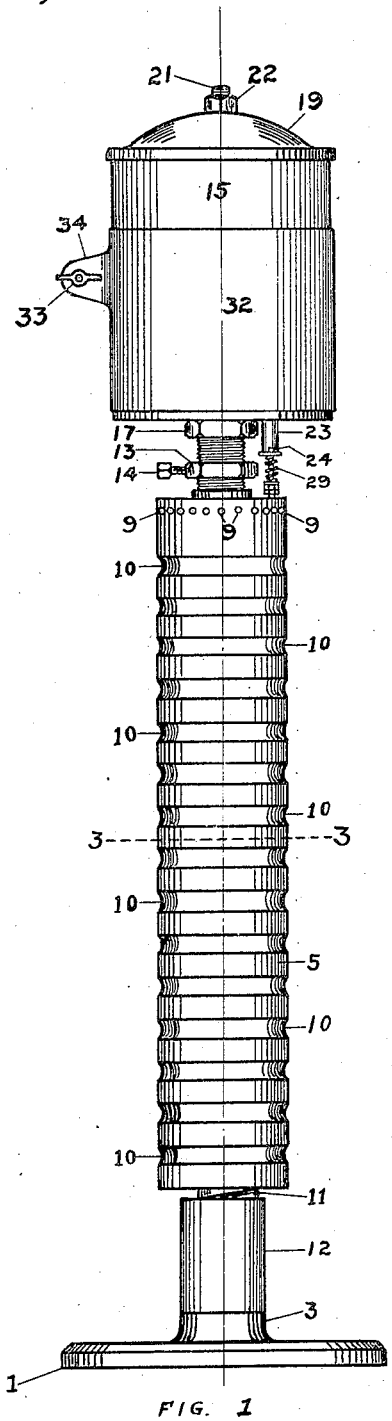
Figure 2:
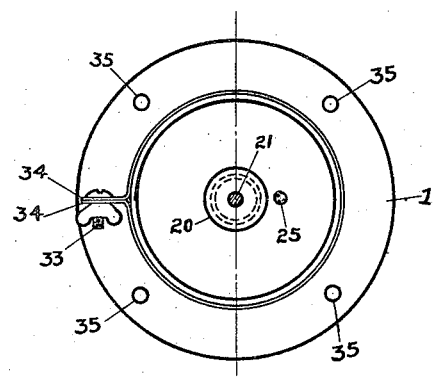
Figure 3:
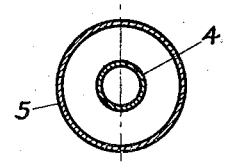
Figure 4:
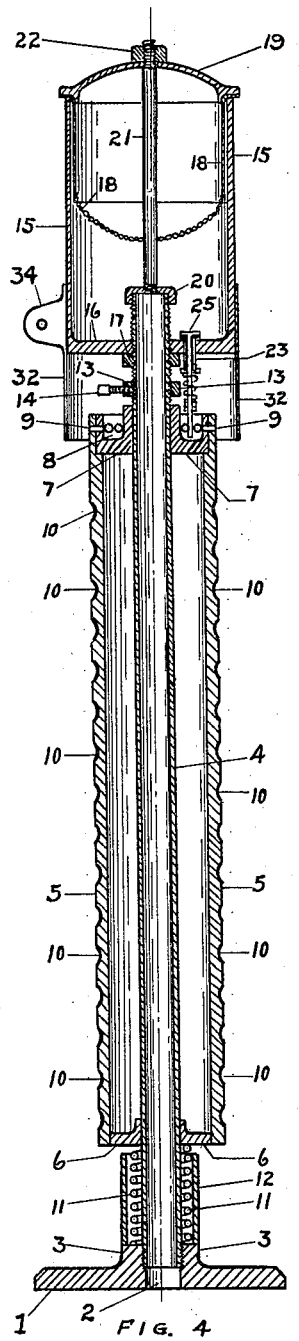
Figure 5:
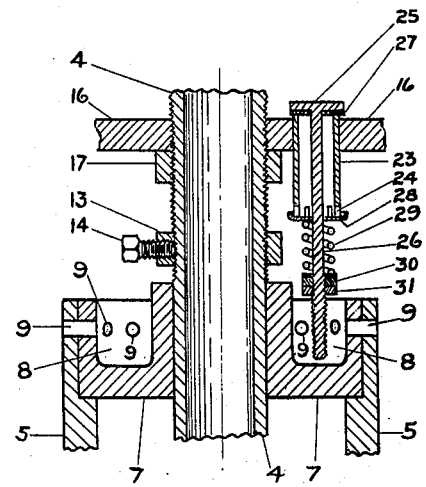
Figure 6:
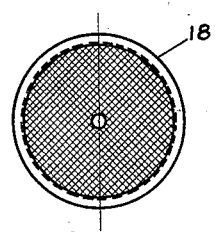

The preferred means for carrying out the principles of my invention in a practical manner is shown in the accompanying two-sheets of drawings, in which—Figure 1 shows my complete construction in elevation. Fig. 2 is a top plan view of the invention. Fig. 3 is a cross section, as taken on the line 3—3 of Fig. 1. Fig. 4 is a vertical, longitudinal, central section, as taken through the entire construction. Fig. 5 is an enlarged detail, the same being a vertical section, the same as Fig. 4, but showing only the central mechanism on an enlarged scale from that of Fig. 4. And Fig. 6 is a plan view of the strainer alone.

Similar indices denote like parts throughout the several views.

In order that the construction, the operation, and the advantages of my invention may be more fully understood and appreciated I will now take up a detailed description thereof in which I will set forth the invention as fully and as comprehensively as I may.

Referring now to the drawings in detail: Numeral 1 denotes the base, which is in the nature of a round disk having a central aperture 2 therein, and extending upward around said aperture is the collar 3 which is interiorly threaded, to receive the lower threaded end portion of the standard 4 which is in the nature of a pipe the upper end of which is also exteriorly threaded.

The drum 5 is considerably larger in diameter than the standard 4 with which it is concentric. Said drum has a head 6 secured in its lower end with an aperture through said head to fit the standard 4 which may slide endwise thereon. Secured in the upper end of the drum 5 is the head 7, through the center of which is an aperture in which the standard 4 is located whereby the drum may slide up and down on the standard. The head 7 is cup-shaped, that is to say, it has a comparatively large channel 8 therein which is adapted to contain oil. A plurality of small apertures 9 radiate out from the channel 8 to the periphery of the drum 5, as shown.

The periphery of the drum 5 is provided with a plurality of grooves 10 extending therearound in the periphery thereof.

Seated on the collar 3 and surrounding the standard 4 is the comparatively heavy coil spring 11 on which rests the drum 5, said spring being in contact with the head 6.

Loosely surrounding the spring 11 is the thimble 12, which also rests on the collar 3, but the spring 11 normally retains the drum slightly above the thimble, as shown in Fig. 4, and said thimble limits the downward movement of the drum as is apparent.

Threaded on the standard 4, slightly above the head 7, is the adjusting nut 13, which may be run up or down and it is adapted to limit the upward movement of the drum. After said nut has been placed at the proper position it may then be locked at that point by means of the set-screw 14.

Numeral 15 denotes the vertical wall of the reservoir, and it has a bottom 16 formed integral therewith, as indicated.

In the center of the bottom 16 is a threaded aperture through which is run the threaded upper portion of the standard 4. There is a packing nut 17 also threaded on the standard 4 and it is adapted to contact with the bottom 16 to prevent leakage.

Located in the reservoir and suspended from the upper edge thereof is the strainer 18. A cover or lid 19 is provided to inclose the top of the reservoir substantially as shown. Threaded on the upper end of the standard 4 within the reservoir, is the cap 20. Threaded into said cap and extending upward therefrom through the center of the strainer 18 and the lid 19, is the rod 21. Threaded on the upper end of the rod 21 is a nut 22 by which the lid 19 may be securely retained in position.

The valve comprises a tube 23, whose upper end is secured in an aperture formed through the bottom 16. There are a plurality of notches or openings 24 formed in the lower end of the tube 23. A cap 25 is adapted to rest on the upper end of the tube 23 and close the opening therethrough. A stem 26 extends down through the tube 23 from the center of the cap 25 to a point near the bottom of the channel 8, the lower portion of said stem being threaded. In practice a leather gasket 27 covers the lower face of the cap 25 to contact with the upper edge of the tube 23, and the stem 26 is disposed through said gasket 27 whereby it is retained in place. Numeral 28 denotes a metal disk which is adapted to loosely contact with the lower end of the tube 23 with the stem 26 adapted to slide in an aperture in the center of said disk.

A helical spring 29 surrounds the stem 26 with its upper end in contact with the disk 28. A nut 30 is threaded on the lower portion of the stem 26 and it contacts with the lower end of the spring 29. Numeral 31 denotes a lock-nut for securing the nut 30.

Numeral 32 denotes the guard, which is in the nature of a sheet metal skirt surrounding the reservoir 15, to which it is adapted to be clamped by means of the thumb-nut and bolt 33 which bolt extends through the ears 34. Said skirt may be lowered, as in Fig. 4, in order to inclose and protect the valve mechanism, and to prevent water or snow from getting into the channel 8.

Formed in the disk 1 are a plurality of bolt apertures 35 which provide means by which the device may be secured in proper position for operation, in which position it is shown in Fig. 1.

Operation: It is well known that a hog will be inclined to rub against the drum 4, moving his body up and down and forward and backward. And as the drum is balanced on the spring 11 it can be moved upward very easily. Therefore as the hog moves the drum upward it will be seen that the bottom of the channel 8 will engage the lower end of the stem 26 thereby raising the cap 25 and permitting oil from the reservoir to pass down through the tube 23 and out through the notches 24, from which it will drop into the channel 8. From the channel 8 the oil will percolate out through the apertures 9, from which it will run down slowly over the entire periphery of the drum. As soon as the hog stops rubbing it is manifest that no more oil will leave the reservoir, but the drum will be oiled for the next animal, as oil will continue to issue, slowly, from the channel 8 for some time. As the animal moves its body up and down against the drum it is evident that oil will be rubbed into his hair and over his hide, and also as he moves forward and rearward, in contact with the drum, that the drum will rotate thereby bringing the entire circumference of the drum into contact with the animal and thereby thoroughly oiling the animal.

I desire that it be understood that various changes may be made in the several details of construction without departing from the spirit of the invention and without sacrificing any of the advantages thereof which are new and useful.

Having now fully shown and described my invention, what I claim, and desire to secure by Letters Patent of the United States, is—

1. A hog oiler comprising a base, a standard projecting upward from the base, a drum mounted around the standard and adapted to revolve and to slide endwise thereon, a spring supporting the drum, an oil reservoir mounted on the upper end of the standard, a valve located in the bottom of the reservoir and adapted to be opened by the upward movement of the drum, substantially as set forth.

2. A hog oiler comprising a base, a standard extending upward from the base, a drum mounted around the standard and adapted to revolve and to slide up and down on the standard, a spring supporting the drum, an oil reservoir mounted on the upper end of the standard, a valve which is normally closed located in the bottom of the reservoir and adapted to be opened only by the upward movement of the drum, there being a channel formed in the upper end of the drum to catch the oil from the valve and having apertures leading therefrom by which the oil from said channel is distributed around the drum to spread thereover by gravity.

3. A hog oiler comprising a base, a standard extending up from the base, an oil reservoir located on the upper end of the standard, a drum surrounding the standard and located below the reservoir, spring means for supporting the drum, means for limiting the downward movement of the drum, means for limiting the upward movement of the drum, there being an oil containing channel formed in the upper end of the drum, a valve located in the bottom of the reservoir, means whereby said valve will be opened by the upward movement of the drum, and a skirt for protecting said valve and said oil containing channel, means for adjustably securing said skirt to said oil reservoir, all substantially as shown and described.

4. A hog oiler comprising a base, a standard extending up from the base, an oil reservoir located on the upper end of the standard, a drum surrounding the standard, heads secured in the ends of the drum and forming bearings whereby said drum is both rotatably and slidably mounted on the standard, spring means for supporting the drum, a valve located in the bottom of the reservoir and adapted to be opened only by the upward movement of the drum, means for catching the oil which issues from the valve and distributing it over the entire periphery of the drum, all substantially as shown and described.

In testimony whereof I have hereunto subscribed my name to this specification in the presence of two subscribing witnesses.

CHARLES A. HAISLEY.

Witnesses:
ROBT. W. RANDLE,
M. E. RANDLE.